(12) United States Patent
Bennett et al.

(10) Patent No.: US 6,590,831 B1
(45) Date of Patent: Jul. 8, 2003

(54) METHOD AND APPARATUS FOR CONTROLLING AND OPTIMIZING SEISMIC DATA ACQUISITION

(75) Inventors: Colin M. Bennett, Houston, TX (US); Loran D. Ambs, Fulshear, TX (US); Mark Zajac, Katy, TX (US)

(73) Assignee: Westerngeco L.L.C., Houston, TX (US)

( * ) Notice: Subject to any disclaimer, the term of this patent is extended or adjusted under 35 U.S.C. 154(b) by 0 days.

(21) Appl. No.: 09/433,666

(22) Filed: Nov. 4, 1999

Related U.S. Application Data

(63) Continuation-in-part of application No. 09/304,506, filed on May 3, 1999, now Pat. No. 6,285,956, and a continuation-in-part of application No. 09/000,769, filed on Dec. 30, 1997, now Pat. No. 6,028,817.

(51) Int. Cl.[7] .................................................. G01V 1/38
(52) U.S. Cl. .......................................... 367/16; 702/14
(58) Field of Search ........................ 702/14, 6; 367/16

(56) References Cited

U.S. PATENT DOCUMENTS

| | | | |
|---|---|---|---|
| 3,256,501 A | | 6/1966 | Smith et al. .................. 340/7 |
| 3,806,863 A | * | 4/1974 | Tilley et al. ................. 340/7 R |
| 3,931,608 A | * | 1/1976 | Cole .......................... 340/7 PC |
| 4,033,278 A | * | 7/1977 | Waters ........................ 114/245 |
| 4,375,089 A | | 2/1983 | Thigpen et al. ................ 367/20 |
| 4,463,701 A | * | 8/1984 | Pickett et al. ................ 114/245 |
| 4,669,067 A | | 5/1987 | Roberts ........................ 367/19 |
| 4,729,333 A | * | 3/1988 | Kirby et al. .................. 114/244 |
| 4,809,005 A | * | 2/1989 | Counselman, III .......... 342/352 |
| 4,890,568 A | * | 1/1990 | Dolengowski ............... 114/246 |
| 4,912,682 A | * | 3/1990 | Norton, Jr. et al. ........... 367/19 |
| 5,052,814 A | * | 10/1991 | Stubblefield .................. 367/15 |
| 5,353,223 A | * | 10/1994 | Norton et al. ............... 364/421 |
| 5,443,027 A | * | 8/1995 | Owsley et al. ............... 114/244 |
| 5,532,975 A | * | 7/1996 | Elholm ........................ 367/17 |
| 5,650,981 A | * | 7/1997 | Jacobsen et al. ............. 367/19 |
| 5,682,357 A | * | 10/1997 | Rigsby ........................ 367/15 |
| 5,724,241 A | | 3/1998 | Wood et al. ................ 364/421 |
| 5,757,725 A | * | 5/1998 | Wilson et al. .............. 367/130 |
| 5,790,472 A | | 8/1998 | Workman et al. ............. 367/19 |
| 5,913,280 A | * | 6/1999 | Nielsen et al. .............. 114/242 |
| 6,028,817 A | * | 2/2000 | Ambs .......................... 367/17 |
| 6,285,956 B1 | * | 9/2001 | Bennett et al. ............... 702/14 |

FOREIGN PATENT DOCUMENTS

| | | | | |
|---|---|---|---|---|
| EP | 0 154 968 A | | 9/1985 | ............ G01V/1/38 |
| FR | 0 188 928 A1 | | 7/1986 | ............ G01V/1/38 |
| GB | 2 323 668 A | | 9/1998 | ............ G01V/1/22 |
| WO | WO 99/34238 A | | 7/1999 | ............ G01V/1/28 |

\* cited by examiner

*Primary Examiner*—Edward Lefkowitz
*Assistant Examiner*—Victor J. Taylor
(74) *Attorney, Agent, or Firm*—David S. Figatner; Madan, Mossman & Sriram, P.C.

(57) ABSTRACT

A system and method for coordinating the operation of multiple manned, remotely operated or autonomous marine vessels engaged in marine seismic data acquisition to direct cooperating vessels from one point to the next while minimizing deviations in the desired spatial configuration of assets, risk to vessels and seismic assets, and personnel and to obtain optimal midpoint coverage by evaluating inputs from subsystems providing positioning information for cooperating vessels, prospect coverage, vessel capabilities, environmental information, and navigation hazards.

40 Claims, 5 Drawing Sheets

METHOD AND APPARATUS FOR CONTROLLING AND OPTIMIZING SEISMIC DATA ACQUISITION

CROSS REFERENCE TO RELATED APPLICATIONS

This application is a continuation in part of Ser. No. 09/000,769, filed Dec. 30, 1997, now U.S. Pat. No. 6,028,817 by Ambs issued on Feb. 22, 2000 which is hereby incorporated by reference herein in its entirety. This application is also a continuation in part of Ser. No. 09/304,506 filed May 3, 1999, now and claims priority from U.S. Pat. No. 6,285,956 by Bennett and Ambs, issued on Sep. 4, 2001 which is hereby incorporated by reference herein in its entirety.

BACKGROUND OF THE INVENTION

1. Field of the Invention

The present invention relates generally to a method and apparatus for coordinating the operation of multiple remotely operated or autonomous marine vessels engaged in marine seismic data acquisition comprising a vessel management system and in particular to a real-time feed back and positioning method and apparatus that will to provide a recommendation for optimal midpoint coverage.

2. Description of the Related Art

The prior art discloses a wide variety of marine seismic systems with one or more streamers and/or one or more seismic sources, some of which include a main or host vessel and other unmanned remote control vessels, or apparatuses such as floats, paravanes, or buoyant members which are connected to the host vessel by lines, streamer cables or tethers. Considerable power is required for a host vessel to tow such existing seismic streamer systems and cables interconnecting sensing devices with a tow vessel. A typical host vessel is able to tow a plurality of associated vessels or apparatuses and can carry a plurality of undeployed seismic streamers and associated apparatuses.

With known cable tow systems, the location and spacing of system components is illustrated by the type, size, and length of cables used and by the characteristics of tow vessels and other devices of the systems. Changing the configuration of an array of prior art components, e.g., streamers can be a complex, time-consuming operation.

U.S. Pat. No. 5,724,241, entitled "Distributed Seismic Data-Gathering System," by Wood, et al., describes a distributed seismic data acquisition system of a plurality of Autonomous Data Acquisition Modules (ADAMs) to each of which are interconnected a subplurality of data-collection channels. Each data collection channel is composed of an array of seismic sensors for continuously measuring seismic signals. The ADAMs includes a GPS satellite receiver for providing geographic coordinates and a system clock. Measured seismic signals are quantized and continuously downloaded to respective interconnected ADAMs from the data-collection channels. The system includes both field-testing capability as well as means for transmitting the results of self-tests.

During a typical marine seismic survey a seismic vessel traverses programmed tracks towing arrays of seismic sources and seismic streamer cables. A seismic streamer cable normally contains a plurality of hydrophones that convert seismic pressure waves, initiated by the sources and reflected from the subsurface geological formations, into electrical signals, which are recorded on a marine seismic data acquisition system located on the vessel. Due to the increasing use of marine three-dimensional (3-D) seismic data, multi-cable marine surveys are now commonplace. During a typical marine 3-D seismic survey, a vessel may tow as many as ten or more streamer cables, with cables ranging in length from three to eight or more kilometers. As reported by Gadallah in "Reservoir Seismology" 1994, pp. 209–237, the goal of a normal marine 3-D seismic survey is to use these arrays of seismic sources and streamer cables to record a highly sampled grid of "bins" of subsurface seismic coverage.

A natural consequence of towing such streamer cable configurations in a marine environment is that currents, wind, and wave action will deflect the streamer cables from their intended paths. Streamer cable drift presents a continuing problem for marine seismic surveys. See, for example, U.S. Pat. No. 5,532,975. The ability to control the position and shape of the streamer cables is desirable for preventing the entanglement of the streamer cables and for avoiding collisions with offshore hazards such as marine drilling rigs and platforms. It is also desirable to have the ability to control the position and shape of the streamer cables during marine 3-D seismic surveys because the 3-D seismic binning process acquires subsurface seismic coverage by combining seismic data from different lines. The need for ability to control the position and shape of the streamer cables is taught by Franklyn K. Levin in "Short Note: The Effect of Binning on Data from a Feathered Streamer," Geophysics, Vol. 49, No. 8, pp. 1386–138,7.

Streamer positioning devices are well known in the art. Apparatuses, such as those disclosed in U.S. Pat. Nos. 5,532,975; 4,729,333; and 4,463,701, have been devised for attachment to the front end of streamer cables for the purpose of maintaining them at a lateral offset to the pathway of the towing vessel. Steerable tail buoys, as described in U.S. Pat. No. 4,890,568, have also been designed for controlling the position of the tail end of seismic streamer cables. The prior art also discloses streamer positioning devices that may be attached externally to the streamer cables. For example, devices to control the lateral positioning of streamer cables by using the camber adjustable hydrofoils or angle wings are disclosed in (U.S. Pat. Nos. 4,033,278 and 5,443,027. U.S. Pat. No. 3,931,608 describes an apparatus, typically known as a "bird", to control the vertical positioning of streamer cables with diving planes and a present depth control means.

The use of streamer positioning devices comes at the price of introducing increased noise onto the seismic streamer and hence into the hydrophones. The areas of greatest noise are from those hydrophones adjacent externally attached streamer-positioning devices, such as depth controlling birds. This problem has been described by Schoenberger and Misfud, "Hydrophone Streamer Noise," GEOPHYSICS, Vol. 39, No. 6, pp. 782–784. It is well known in the art that noise limits the resolution of a seismic survey. Consequently, a maximum allowable hydrophone noise level is typically established for each marine seismic surveying project. When this noise level is exceeded, seismic acquisition is usually suspended, resulting in lost time and additional cost. Data acquired under such conditions may need to be reacquired.

Location sensing devices and methods for determining the positions of the seismic sources and seismic streamer cables are also well known in the art. For example, both a Global Positioning System, as described in U.S. Pat. No. 4,809,005, and a network of acoustic elements, as described in U.S. Pat. No. 4,912,682 may be deployed on the vessel, streamer cables, and tail buoy. These devices and methods may then be used to determine the real time positioning of the seismic sources and seismic streamer cables by computing a network solution to a Kalman filter, as disclosed by U.S. Pat. No. 5,353,223.

As known to those familiar with the art of marine seismic surveying, during a typical seismic survey a human operator monitors the survey's operational conditions, such as the extent of the subsurface seismic coverage, the adequacy of the separations between streamer cables, and the proximity of the streamer cables to obstructive hazards. When these conditions indicate the need to reposition the streamer cables, the operator may manually issue commands to the various individual streamer positioning devices in order to adjust the position and shape of the streamer cable, or order the helmsman or vessel remote control to redirect the vessel, or suspend data acquisition.

A typical three-dimensional marine geophysical survey is performed by transiting a pre-defined grid of parallel lines in order to cover a desired survey area at a required minimum multiplicity for common midpoint coverage. During each pass over the grid a spread of seismic sources and receivers is used to produce the desired subsurface common midpoint coverage. Because the seismic spread is perturbed due to errors in the towing vessel's motion, tidal streams, ocean current, river estuaries, etc. sub-optimal midpoint coverage is obtained. To mitigate the loss of coverage an operator will attempt to maneuver the towing vessels to his or her interpretation of the best geometry. Such manual maneuvering is by nature a labor-intensive process and highly subject to operator bias, error and as such is prone to failure. To recover data caused by this lack of coverage, extra passes over the grid must be performed before the necessary common midpoint coverage can be achieved. These extra passes can significantly increase the survey costs. Thus, there is a need for a system that will, by maneuvering the vessels towing the seismic streamers and sources, optimize the common midpoint coverage obtained during acquisition, minimize the number of survey lines, the duration of the survey and thus the acquisition and post-acquisition processing costs.

While the prior art discloses a series of discrete devices for locating and controlling the positions of streamer cables, it does not teach or identify any single system which coordinates the movement of a plurality of remote vessels and attached seismic, position and environmental sensors to calculate optimal midpoint coverage vessel/sensor paths to maximize coverage of the plurality of remote vessels and the attached seismic sensors.

Thus there is a need for a single remote vessel management system which coordinates the movement of a plurality of remote vessels and attached seismic, position and environmental sensors and calculates optimal midpoint coverage for the vessel and source/sensor paths in order to maximize coverage and reduce non-coverage by the plurality of remote vessels and their attached seismic assets.

When multiple ships, whether manned or not, are used to acquire seismic data, they must be carefully positioned to maintain spatial configuration of the towed assets through a survey and also maintain the safety of the trailing assets, the vessel and crew. In the past, this has been accomplished by careful piloting by the ship's crew augmented by radio voice communication. As the required precision has increased and new automatic positioning devices have become available, multiple ships have relied on auto helm systems and information sharing between ships. There has been a need for a system to autonomously coordinate the movement of multiple ships participating in a seismic survey to maximize safety for the vessels, seismic assets and crew while also minimizing deviations from desired spatial configuration of the assets.

SUMMARY OF THE INVENTION

The present invention provides a system that, by maneuvering vessels towing seismic streamers and sources, optimizes the common midpoint coverage obtained during seismic data acquisition, minimizes the number of survey lines, the duration of the survey and the acquisition and post-acquisition processing costs. The present invention provides a system that coordinates the movement of a plurality of remote vessels and attached seismic, position and environmental sensors to obtain optimal midpoint coverage vessel/sensor paths to maximize coverage of the plurality, of remote vessels and the attached seismic sensors within the constraints of safety for personnel and equipment.

In one aspect of the present invention, a method and system are provided for coordinating the operation of one or more marine vessels engaged in seismic data acquisition comprising at least one vessel for performing one or more of deploying a source of acoustic energy for generating acoustic waves, deploying a receiver for receiving seismic data, and a processor for monitoring a parameter of interest of the received seismic data and generating control commands for controlling the at least one vessel in response thereto, the vessel further comprising a position sensor for determining a position of at least one vessel, the source of acoustic energy, the seismic receiver, and a vessel maneuvering system comprising a receiver for receipt of vessel control commands, a processor interpreting vessel control commands, and an output for executing vessel control commands. An environmental sensor is provided for monitoring and transmitting environmental data to the processor.

The processor receives position, environmental and operation data and sends a vessel control command to the vessel maneuvering system. Vessel maneuvering includes changes in heading, speed or depth of operation. The environmental data comprises at least one of: wind speed, wind direction, wave height, wave direction, wave period, tidal stream, ocean current, or water depth. A coverage optimization system wherein the coverage optimization system receives seismic coverage information, and sends optimum seismic source and seismic receiver positions to the vehicle management system. The VMS sends commands to the steering system. A binning system provides seismic coverage data to the coverage optimization system. The coverage optimization system receives operator data, position data and environmental data. The position sensor monitors seismic source position, seismic receiver position, vessel position, vessel ground speed, water speed, vessel track, and vessel heading. An operator console for operator data input wherein the operator data comprises prospect coverage area definition, required midpoint coverage, operational constraints, vessel performance data, or operator control.

In another aspect of the invention a method and system are provided wherein the binning system provides a current seismic midpoint coverage assessment to the coverage optimization system. The vessel control command comprises optimum locations for at least one of the seismic source, the receiver, or the vessel. The coverage optimization system generates a pre-plan and line selection based upon the available source and receiver assets, environmental data, past performance and operational constraints. The coverage optimization system generates real-time optimum source and receiver locations using computed source, receiver and towing vessel coordinates, in-water asset dynamics, past midpoint coverage, midpoint coverage required, operational constraints and environmental data. The COS provides optimum locations, and the VMS produces steering commands based on tow vehicle limitations, hazards, etc. In another aspect of the invention a method and system are provided wherein the coverage optimization system generates a pre-plan and line selection based upon the available source and receiver assets, environmental data, past performance and operational constraints.

DETAILED DESCRIPTION OF A PREFERRED EMBODIMENT

Figure 1:
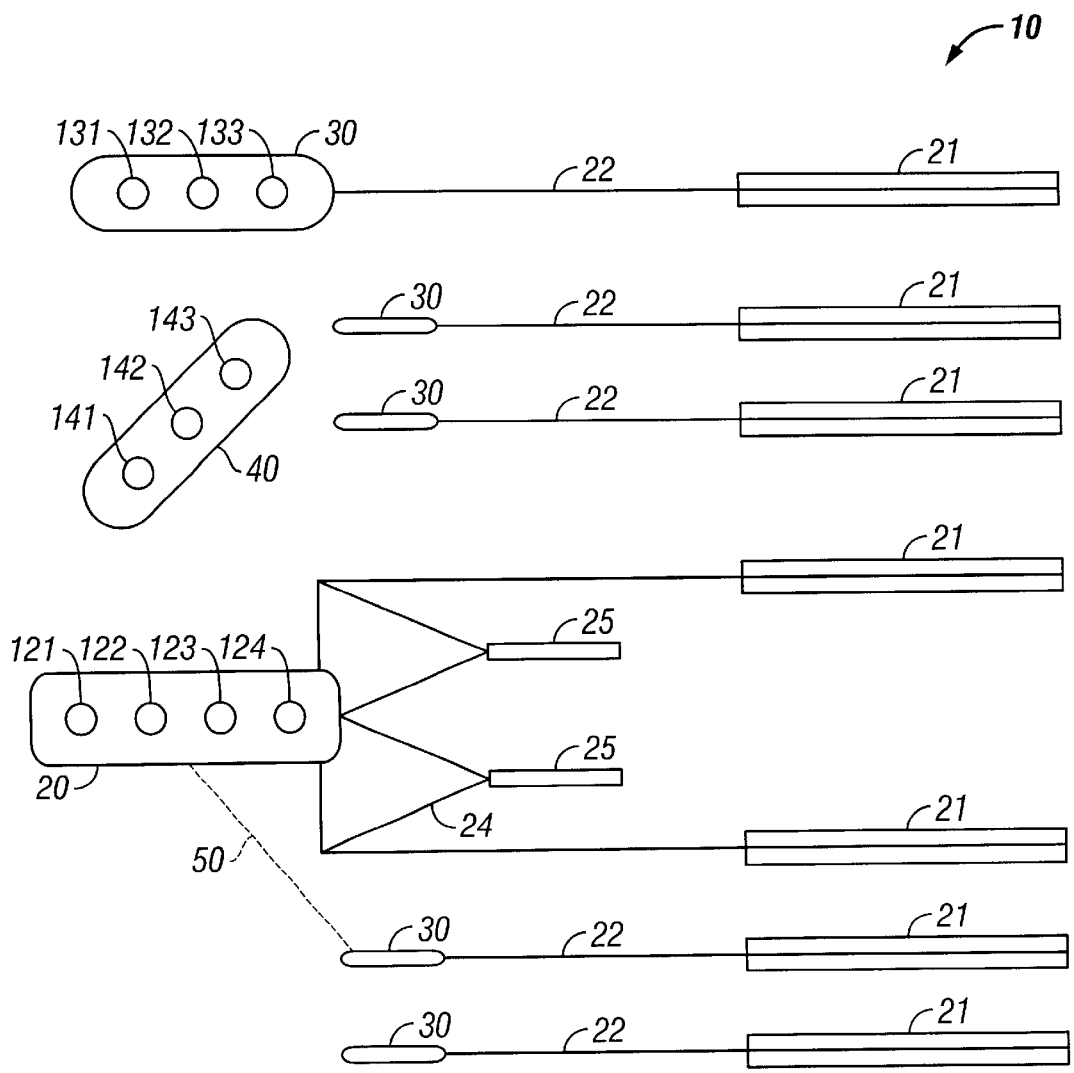
FIG. 1 is a schematic top view of a Marine Seismic Streamer System that may be used in accordance with the present invention.

FIG. 1 discloses a marine seismic system 10 typically used in conjunction with the present invention. The marine seismic system may provide a host vessel 20 to which are connected seismic sensor streamers 21, each including a plurality of seismic sensors. Tag lines 24 separate seismic sources 25 towed behind the host vessel 20.

A plurality of manned or unmanned powered tow vessels 30 are positioned on either side of the host vessel 20. In an alternative embodiment, the vessels are manned but selectively controlled remotely. Each powered tow vessel 30 tows a seismic sensor streamer 21 via a streamer lead-in 22 connected between the vessel and the streamer. Alternatively one or more such powered tow vessels 30 may be positioned on only one side of the host vessel.

A service/supply boat 40 provides fuel transfer to/from the various vessels 20 and 30, and, in one aspect, retrieves data from the vessels 30 and either takes the data to another vessel, another device, and/or to the host vessel 20 or sends it via a data link (e.g. radio or laser/optical system) to vessel 20, to a remote location or to another vessel. The service/supply boat 40 navigates and operates between the host vessel 20 and the vessels 30. The dotted line 50 in FIG. 1 indicates that at any time any vessel (including the service supply boat 40 and any vessel 30) may be releasably tethered to the host vessel 20 at any point or location thereon.

The marine seismic system may use one or more vessels 30; no vessel 40 or one or more vessels 40; and no host vessel 20 or one or more host vessels 20. The marine seismic system may use one or more towing vessels 30 with at least one seismic source and/or at least one seismic streamer 21 with at least one or with a plurality of sensors with any known system which has none, one, or more than one seismic streamer connected to a host vessel. The marine seismic system may use one or at least one vessel 30 and its related apparatus to tow one, two, three, four or more seismic sources and/or streamers. The marine seismic system may use vessel 30 to tow one or more seismic sources 25. These sources may be interspersed between streamers, outboard of streamers, or forward or aft of streamers.

Figure 2:
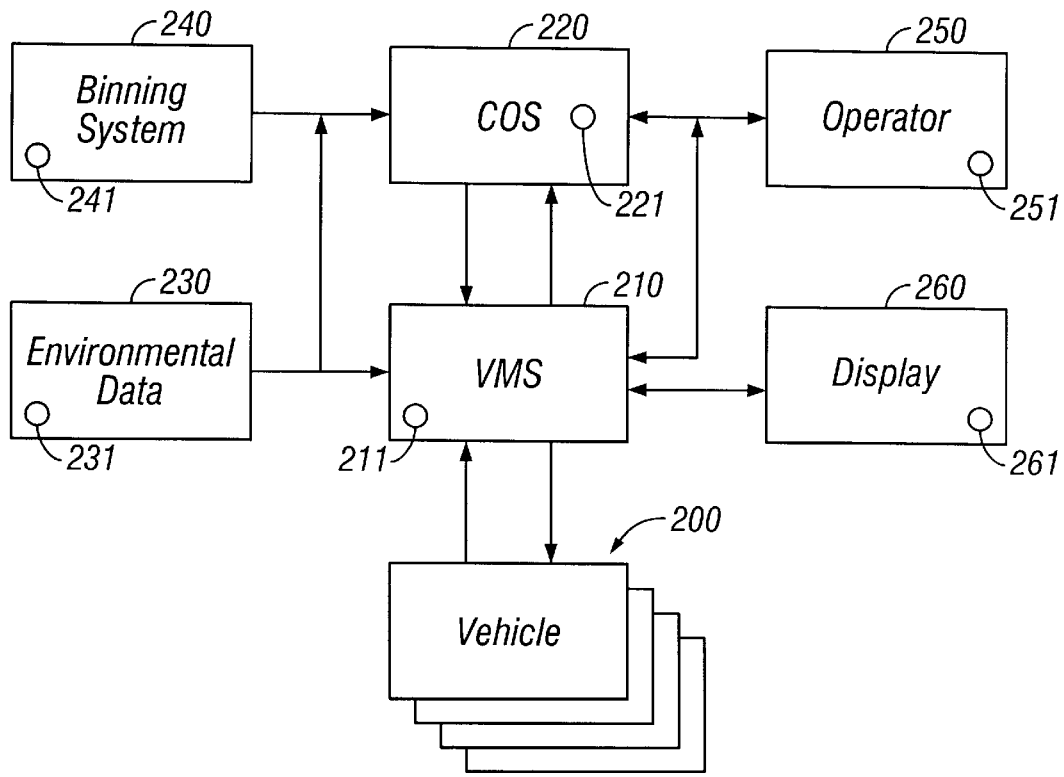
FIG. 2 is a block diagram of a Vessel Management System with integrated Coverage Optimization System as provided by one aspect of the present invention in a preferred embodiment.

The manned or unmanned powered vessels 30 have apparatus thereon for communicating with the host vessel and/or with a Vessel Management System (VMS) 210 of the present invention, as shown in FIG. 2. These vessels have remotely controlled and/or programmable guidance and control apparatuses. Host vessel 20, tow vessel 30 and support vessel 40, each carry a known positioning system (e.g. but not limited to GPS, GLONASS) which provide precise locations of each vessel. Other measurement apparatuses that may provide locations are seismic sources, tail buoys and the like. Two-way communication links (via hardwire link or radio, e.g. when untethered) between host vessel 20, tow vessel 30, boat 40 or VMS 210 provides a means for exchanging location and navigation data. Additional navigation data from the bridge of host vessel 20 or from a VMS operator console processor 250, may include the locations of other vessels, navigation hazards, etc. Examples of navigation data exchanged between host or towing vessels and their VMS 210 are (but are not limited to) vessel identification, location, heading, course-made-good, and speed. Examples of other information communicated from tow vessels 30 and boat 40 to host vessel 20 or VMS 210 are (but are not limited to) engine temperature, air temperature in instrumentation compartments, fuel level, shaft RPM, electric generator output, tow line tension, rudder or control surface angle, and tow depth of one or more depth sensors from a seismic streamer.

Tow vessels 30 and boat 40 carry, in one aspect, known on-board computer based navigation systems which use location and navigation data provided by host vessel 20 or the VMS 210 to set an appropriate course and speed to accomplish a preprogrammed maneuver such as to maintain position with respect to host vessel 20 or move from one position to another. Each tow vessel 30 and boat 40 may be controlled remotely, by autopilot, by a vessel maneuvering system 280 or by a human operator aboard host vessel 20. Instead of control from a host vessel, control may be accomplished from the VMS 210 on a near-by vessel, a land-based location (e.g. either adjacent to or remote from the location of the tow vessel(s) etc.) and/or from an aircraft either above or remote from the location of the marine seismic system. Commands may be communicated by any known communication system, including, but not limited to, hardwire link, underwater acoustic link, optical, microwave and/or radio. Such commands are, e.g. (but not limited to) controls for the engagement of auto pilot, adjustment and maintenance of rudder or control surface angle, a series of waypoints and schedule to be achieved, and control of shaft RPM.

The vessel or vessels 30 have known apparatus for acquiring seismic data from the seismic sensors, for recording it, and for transmitting this data to the VMS 210 or downloading such data to a service/supply boat or transmitting it to the host vessel or to a remote location. In one embodiment of the present invention, a data acquisition and storage system is located on the VMS. These known systems provide power to the seismic streamer and associated components such as acoustic sensors, depth control machinery, acoustic and radio navigation equipment, amplifiers and the like. The data acquisition system communicates with the VMS 210 or with the host vessel 20 regarding data acquisition parameters such as sample interval record length, sensors to monitor, filter and amplifier settings, file and prospect identification and the like. Upon hardwire or radio command, a recording system records acoustic data from one or more sensors in one or more seismic streamers 21 along with support data indicating the status of system components at the time data was recorded. Data is stored in computer memory or written to a solid state, magnetic, optical or other suitable storage media. Portions or all of the data collected may be transmitted from the data acquisition system to the VMS 210 or the host vessel 20 or to a remote location via apparatus in a tether, hardwire link and/or radio in real-time or some time after recording. Data transfer may be synchronous or asynchronous with data acquisition and may occur when onboard systems are not recording data. Alternatively, boat 40 may establish a physical link (hardwire, optical, etc.) to a tow vessel to extract data from the tow vessel and communicate it to the VMS 210 host vessel 20 or to a remote location via hardwire link or radio.

In one method utilizing the marine seismic system, the vessels 30 are initially tethered to the host vessel 20. Seismic streamers are deployed from the host vessel 20. The seismic streamers are connected with the vessels 30. Then, by remote control, personnel at the VMS operator console 250 or on the host vessel 20 (or at a remote location) start engines on the vessels 30 so that the vessels 30 apply tow force to the seismic streamers. When the vessels 30 carry the tow load of the streamers, tethers connecting the vessels 30 to the host vessel 20 are released and personnel on the host vessel (or elsewhere) monitor the position of the vessels 30 and control them so desired positioning is maintained. If desired, any or all of the vessels 30 are repositioned one or more times with respect to the host vessel 20. If a seismic streamer malfunctions or is to be replaced, its vessel 30 moves away from the array to a repair location or vessel; or it backs off and then enters the array of vessels 30 in such a way that it approaches and moors to the vessel 20. If desired, the remaining vessels 30 are repositioned to account for the deletion of the malfunctioning seismic streamer. A vessel 30 and its associated apparatus do not necessarily require the use of steamer lead-ins, paravanes, and paravane cables.

As shown in FIG. 1, the host vessel (or vessels) 20 or the unmanned towing vessel 30 comprises apparatus 121 for receiving data, e.g. from 8 seismic streamer 21, from a service boat 40, and/or from a tow vessel 30—either by wire (not shown) or wirelessly, apparatus 122 for storing received data including, but not limited to, seismic data; apparatus 123 for sending data including, but not limited to, seismic data by wire (not shown) or wirelessly to another vessel and/or to a remote location; and/or apparatus 124; e.g. an appropriately programmed computer (or computers) for processing the data including, but not limited to, seismic data. Transmitter 123 and receiver 121 may have multiple channels for which data may be communicated (e.g. one or more channels dedicated to seismic, vessel control, vessel status, location).

As shown in FIG. 1, the service boat (or boats) 40 comprises apparatus 141 for receiving data, e.g. from a tow vessel 30 by wire or fiber optic apparatus (not shown) or wirelessly; apparatus 142 for storing received data, and apparatus 143 for sending data by wire (not shown) or wirelessly to another vessel, to a host vessel, and/or to a remote location.

As shown in FIG. 1, a powered tow vessel (or vessels) 30 comprises apparatus 131 for receiving data, including, but not limited to seismic data, from a seismic streamer 21; apparatus 132 for storing received data; and apparatus 133 for sending data by wire (not shown) or wirelessly to the VMS 210 or to another vessel, to a service boat 40, to a host vessel 20, and/or to a remote location. Transmitter 123 and receiver 121 may have multiple channels for which data may be communicated (e.g. one or more channels dedicated to seismic, vessel control, vessel status, location). In one aspect a tow vessel 30 may have apparatus for processing data and for transmitting the processed data. By "tow vessel" herein is meant any vessel, boat, device, float or apparatus that can tow the item(s) connected thereto, said "tow vessel" having suitable power apparatus for such towing. "Processing" data as referred to herein with respect to the processing of data on vessels, boats, or at a remote location includes, but is not limited to, the processing of generated seismic data by any known processing methods or programs and includes the use of appropriate computers at such location. A tow vessel in any system according to the present invention, may tow multiple seismic apparatuses (e.g., but not limited to sensor streamers 21) with apparatuses at different depths and the tow vessel itself may be a surface craft, semi-submerged or submerged.

Turning now to FIG. 2, the present invention provides a method and apparatus for coordinating the operation of known prior art marine seismic systems or a marine seismic system as shown in FIG. 1. The present invention provides a method and apparatus for coordinating operation of multiple remotely operated or autonomous marine vessels engaged in marine seismic data acquisition. The present invention enables real time automated seismic midpoint coverage optimization during seismic data acquisition. As shown in FIG. 2, the present invention comprises a Vessel Management System (VMS) 210 and a Coverage Optimization System (COS) 220. In one preferred embodiment of the present invention, the VMS 210 accepts input from an environmental data source monitor 230, an operator console 250, the COS 220 and a plurality of tow vessels 200. The VMS 210 processor 211 automatically evaluates these inputs. The plurality of vessels 200 provide source and receiver positioning information, vessel health and vessel capabilities for cooperating vessels in communication with the VMS 210. The operator console 250 provides prospect coverage control and navigation hazards. The environmental data source monitor 230 provides environmental information. The VMS 210 formulates vessel control commands to safely direct cooperating vessels 200 from one point to the next while minimizing deviations in the desired spatial configuration of assets, risk to vessels, streamers and personnel. The COS 220 operates to optimize midpoint coverage during vessel passage over a prospect area.

In one preferred embodiment, each vessel 200 contains a processor 124, the VMS 210 contains processor 211, the COS 220 contains processor 221, the Operator Console 250 contains processor 251, the Display 260 contains processor 261, the Binning System 240 contains processor 241, the Environmental data monitor 230 contains processor 231. Each of these processors (124, 211, 221, 241, 251 and 261) comprises a computer, computer read only memory and computer random access memory.

Additional features of the system comprise monitoring and displaying the status of vessels (positions and health) to display 260. An operator may, via console input to the VMS 210 or via a manual control device, provide manual control of the vessels via operator input at the operator console 250. The operator input enables an operator to augment or override VMS 210 vessel control commands and execute evasive maneuvers as deemed necessary.

In a preferred embodiment of the present invention, a Coverage Optimization System (COS) 220 is provided. The COS receives data and information in real-time from a device such as an integrated Navigation System (NS) 270, shown in FIG. 3, a Binning System 240, Environmental Data Source Monitor 230, VMS 210 and the Operator Console 250. The COS uses this information and data, to determine a best geometric configuration for seismic sources, seismic receivers and tow vessels. The COS determines a best-predicted path for all vessels, seismic sources and seismic receivers and streamers deployed by cooperating vessels in a marine seismic system managed by the present invention. The predicted path information is then transferred to the VMS 210 and subsequently to each cooperating towing vessel's 200 vessel maneuvering system 280 so that the towing vessels 200 are maneuvered to the optimum geometry and the best subsurface midpoint coverage is attained. The COS best path prediction process iterates with changes in the input data resulting in adjustments to vessel maneuvering information and the issuance of vessel control commands by the VMS 210. In one embodiment of the present invention, upon completion of a given vessel(s) 200 pass, the COS 220 provides recommendations for the most efficient next data acquisition pass based on historical and most recently acquired data analysis.

Figure 3:
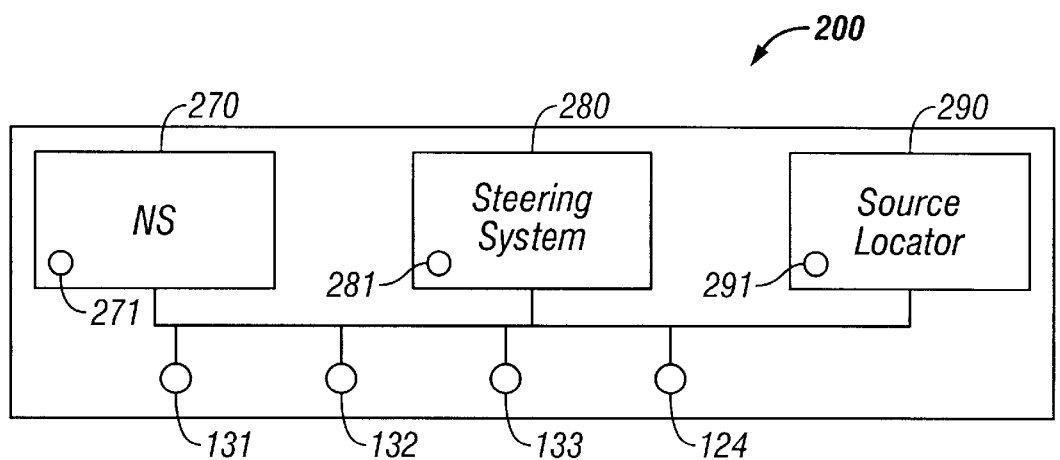
FIG. 3 is a block diagram of a Vessel as provided by one aspect of the present invention in a preferred embodiment.

Turning now to FIG. 3, one of a plurality of vessels 200 is depicted in a block diagram. As shown in FIG. 3, the NS collects real-time measurements for transmission to the VMS. These real-time measurements which are collected by known devices and transmitted for monitoring in the VMS comprise vessel position, vessel speed, gyro track, crab, cable tension, and cable depth. In an alternative embodiment, a source locator 290 will be incorporated in the vessels 200. Source locator 290 determines the real-time tracking and control of the position of a cooperating vessel's seismic source(s) and/or sensor(s). The real-time inputs to the VMS and COS from the environmental system data monitor 230, shown in FIG. 2 comprise acoustic doppler current profiler (VM), stationary current/tidal gauges, tide predictions, wave height, wave direction, wind speed, water depth, and RADAR targets.

Figure 4A:
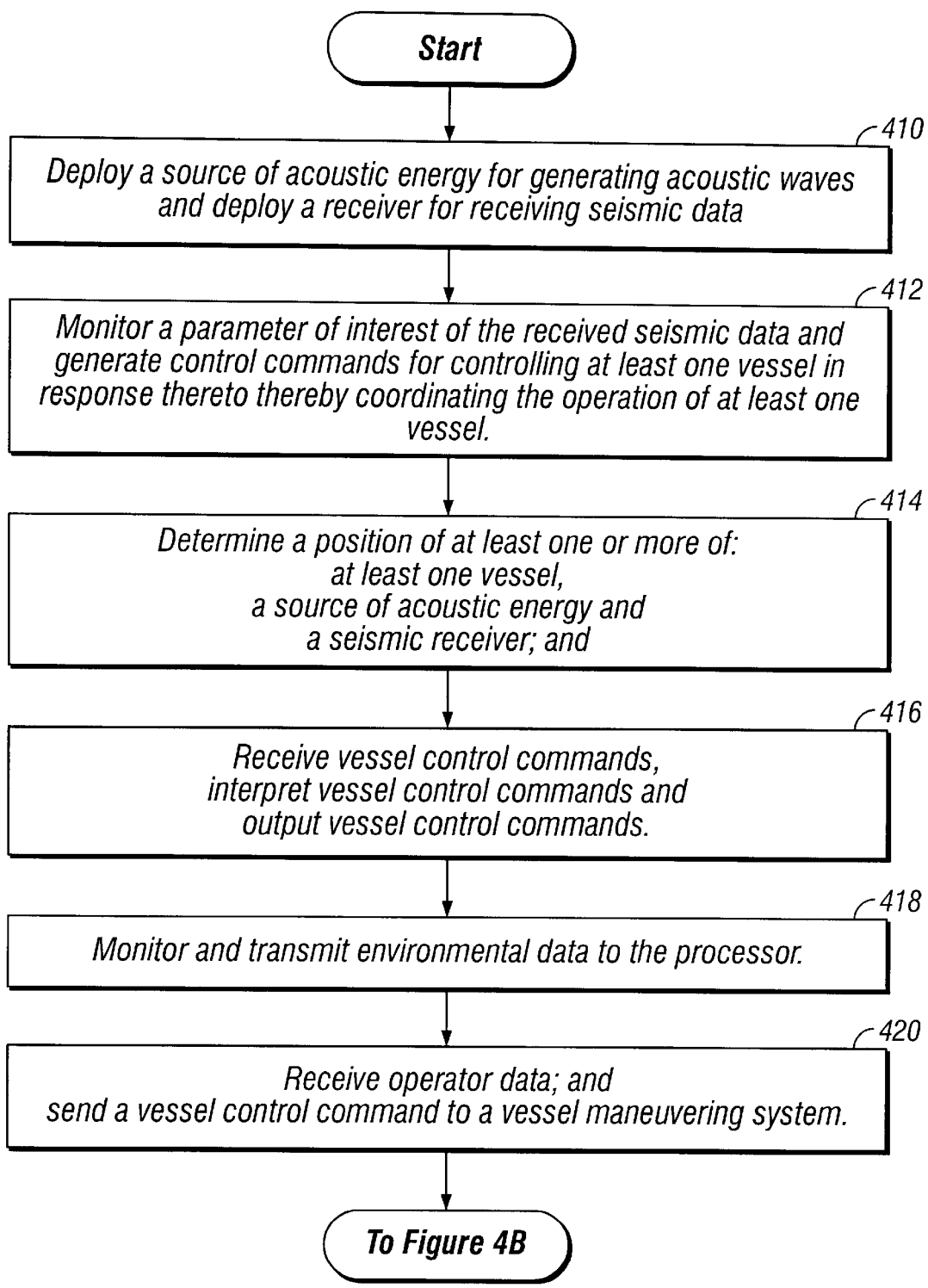
FIGS. 4A–4C are flow charts showing the method steps for generating the control commands for controlling the tow vessel.

Turning now to FIG. 4A, FIG. 4A is a preferred embodiment of the present invention is shown. In 410, the present invention deploys a source of acoustic energy for generating acoustic waves and deploys a receiver for receiving seismic data. In 412, the present invention monitors a parameter of interest of the received seismic data and generates control commands for controlling at least one vessel in response thereto thereby coordinating the operation of at least one vessel. In 414, the present invention determines a position of at least one or more of at least one vessel, a source of acoustic energy and a seismic receiver. In 416, the present invention receives vessel control commands, interprets vessel control commands and output vessel control commands. In 418, the present invention monitors and transmits environmental data to the processor. In 420, the present invention receives operator data and sends a vessel control command to a vessel maneuvering system.

Figure 4B:
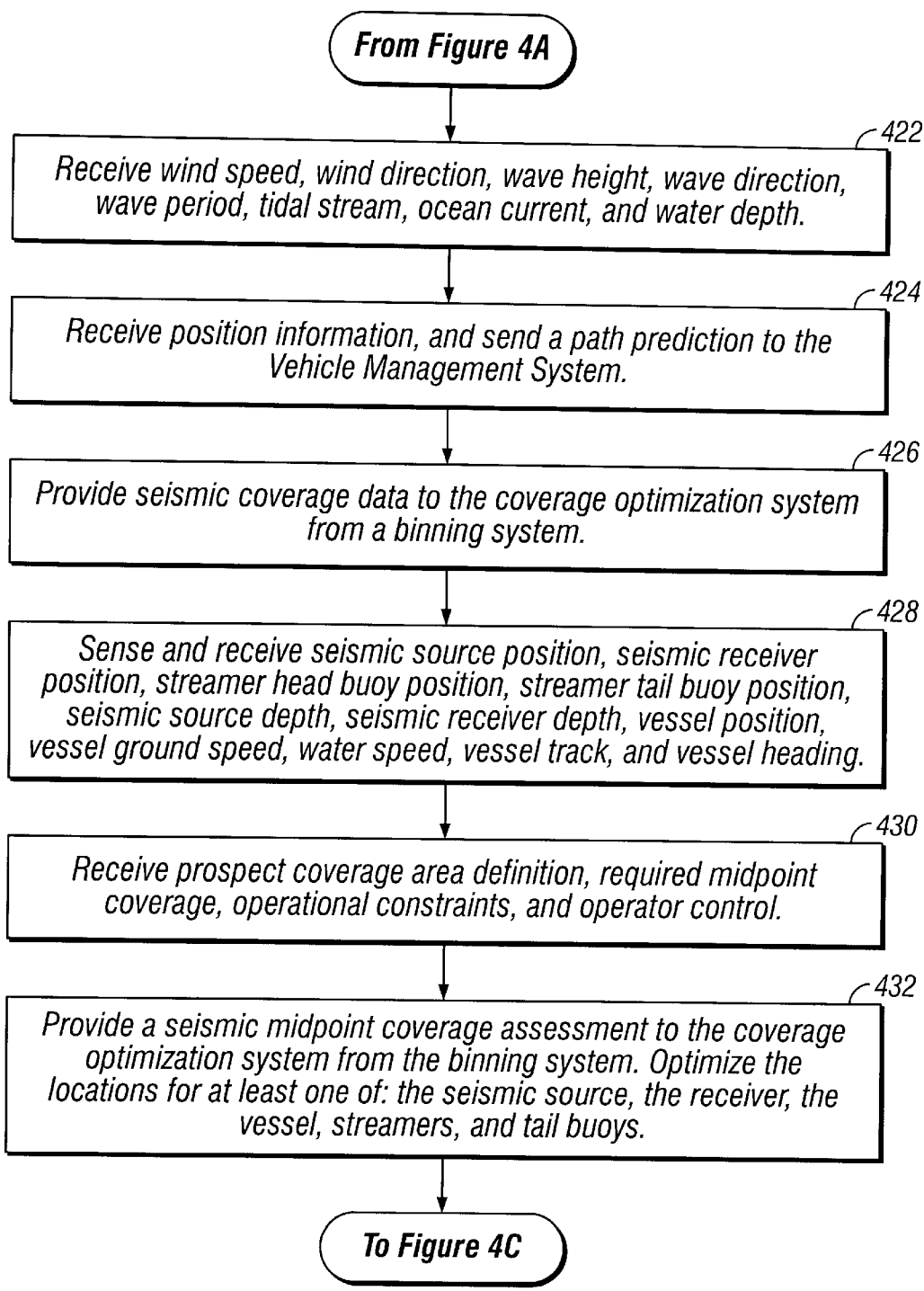

Turning now to FIG. 4B, FIG. 4B is a preferred embodiment of the present invention is shown. In 422, the present invention receives wind speed, wind direction, wave height, wave direction, wave period, tidal stream, ocean current, and water depth. In 424, the present invention receives position information and sends a path prediction to the Vehicle Management System. In 426, the present invention provides seismic coverage data to the coverage optimization system from a binning system. In 428, the present invention senses and receives seismic source position, seismic receiver position, streamer head buoy position, streamer tail buoy position, seismic source depth, seismic receiver depth, vessel position, vessel ground speed, water speed, vessel track, and vessel heading. In 430, the present invention receives prospect coverage area definition, required midpoint coverage, operational constraints, and operator control. In 432, the present invention provides a seismic midpoint coverage assessment to the coverage optimization system from the binning system and optimizes the locations for at least one of: the seismic source, the receiver, the vessel, streamers, and tail buoys.

Figure 4C:
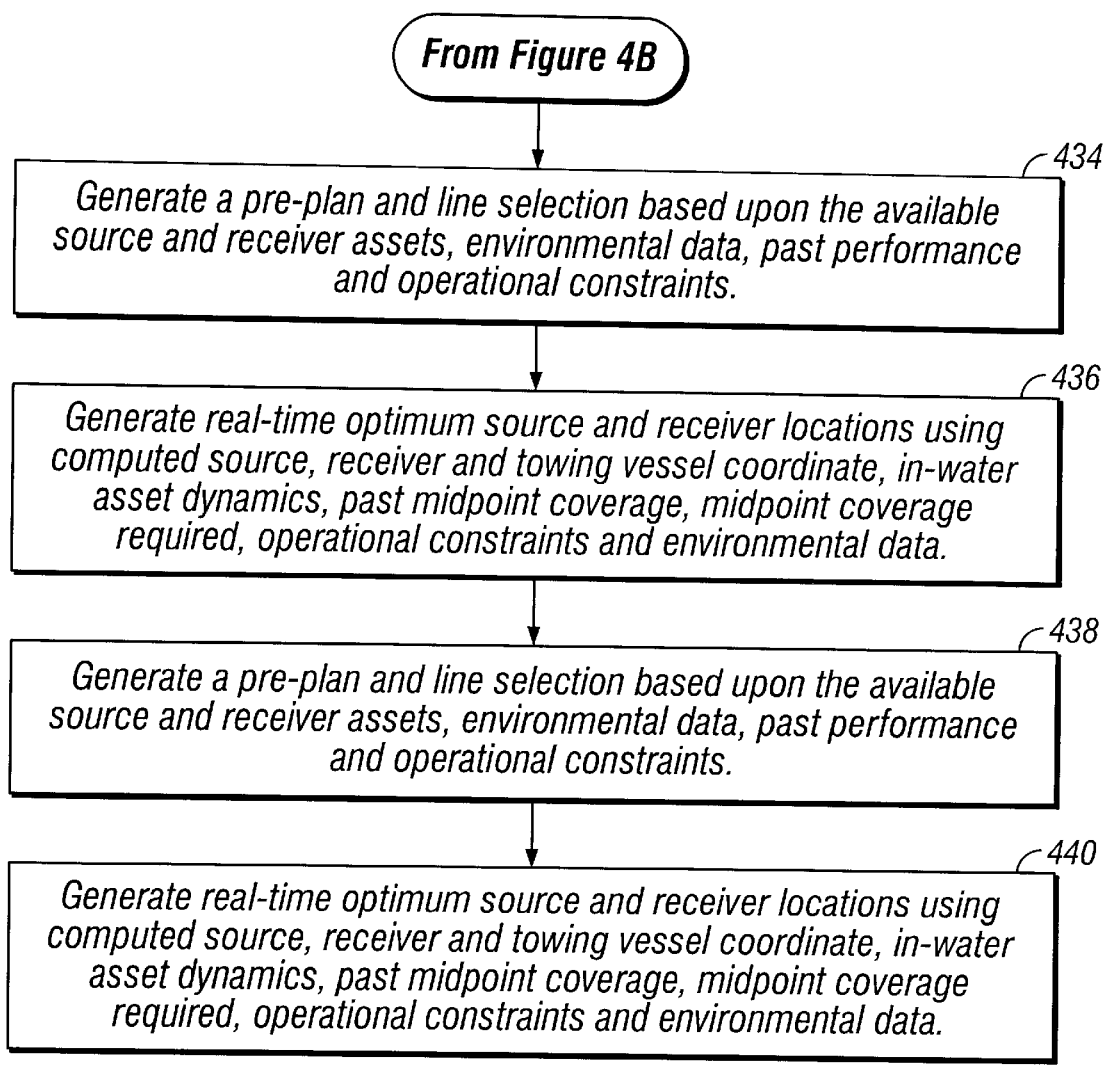

Turning now to FIG. 4C, FIG. 4C is a preferred embodiment of the present invention is shown. In 434, the present invention generates a pre-plan and line selection based upon the available source and receiver assets, environmental data, past performance and operational constraints. In 436, the present invention generates real-time optimum source and receiver locations using computed source, receiver and towing vessel coordinate, in-water asset dynamics, past midpoint coverage, midpoint coverage required, operational constraints and environmental data. In 438, the present invention generates a pre-plan and line selection based upon the available source and receiver assets, environmental data, past performance and operational constraints. In 440, the present invention generates real-time optimum source and receiver locations using computed source, receiver and towing vessel coordinate, in-water asset dynamics, past midpoint coverage, midpoint coverage required, operational constraints and environmental data.

In a preferred embodiment legacy data are input into the VMS via the operator console or another source to provide initialization of a new survey area, provide an input conduit for post-plot data, and provide the criteria by which vessel movements will be restricted. Legacy data comprise nominal spread geometry, nominal grid of coverage parameters, real-time versus post-plot position comparisons, regional current data, hardware specifications, obstructions, bathymetry, existing grid coverage, and modeled towing configurations.

The COS 220 uses a known processing algorithm to process the real-time vessel inputs, environmental data and legacy data to compute a best estimation of the behavior of the streamer cables given these data. In addition, the COS uses a known algorithm to determine what vessel movements are necessary to position predefined portions of the seismic spread and what impact these movements will have on the in-water spread.

The COS additionally comprises consideration of existing coverage deficiencies, lack of coverage in the case of a virgin pass, and the predicted spread geometry to determine where best to position the seismic spread. The COS determines and predicts the most effective path through a grid of coverage over a prospect area. The path predictions are based on real-time inputs and a known algorithm to facilitate optimal midpoint coverage and what pass has the highest probability of realizing the greatest number or nominal fold bins.

As the COS coverage optimization routing digests the prediction data; and determines the most efficient pass, the COS formulates requests for changes to position of seismic assets which are evaluated by the VMS and if achievable without compromise to the safety of assets and personnel, formulates commands for the vessel maneuvering system(s) 280 on each cooperating vessel 200. These vessel control commands comprise directions to steer, speed through the water, turning radius and sensor/receiver position commands to control the position of towed seismic sources and receivers.

The operator console 250 provides for operator intervention to accommodate circumstances where the operator decides the path chosen by the system must be altered for collision avoidance, crew interference, or for survey logistics. Operator intervention includes the ability to resort to manual vessel maneuvering via ship controls, or autopilot without having to stop and restart the acquisitions systems.

The present invention provides a method and apparatus to perform the following functions: (1) Pre-planning and line selection based upon the available source and receiver assets available, environmental data, past performance or success rate and operational constraints (limits on maneuverability and performance, etc.); and (2) Real-time optimum source and receiver vessel maneuvering using computed source, receiver and towing vessel coordinates; in-water asset dynamics (e.g., speed (ground and water) track and heading); past midpoint coverage; midpoint coverage required (the prospect specifications); operational constraints (limits on maneuverability & performance, etc.), environmental data including but not limited to: water depth; ocean currents; tidal stream data: wind speed; wind direction; and wave height, wave period and wave dominant direction.

What is claimed is:

1. A system for coordinating the operation of one or more marine vessels engaged in seismic data acquisition comprising:
   at least one vessel for performing one or more of:
      deploying a source of acoustic energy for generating acoustic waves;
      deploying a receiver for receiving seismic data; and
   a processor for monitoring a parameter of interest of the received seismic data and generating control commands for controlling the at least one vessel in response thereto thereby coordinating the operation of at least one vessel to maneuver for optimum a subsurface midpoint coverage .

2. The system of claim 1, wherein the at least one vessel further comprises:
   A position sensor for determining a position of at least one or more of:
      at least one vessel
      a source of acoustic energy
      a seismic receiver; and
   a vessel maneuvering system comprising:
      a receiver for receipt of vessel control commands;
      a processor interpreting vessel control commands; and
      an output for executing vessel control commands.

3. The system of claim 2 further comprising:
   An environmental sensor for monitoring and transmitting environmental data to the processor for adjusting vessel control commands.

4. The system of claim 2, wherein the processor receives position information and sends a vessel control command to the vessel maneuvering system to minimize deviations in the desired spatial configuration of assets.

5. The system of claim 3, wherein the processor receives environmental data and further comprises a function that determines a best geometric configuration for seismic sources, receivers and tow vessels sends a vessel control command to the vessel maneuvering system.

6. The system of claim 2 further comprising:
   A processor function for determining a predicted path and sending a vessel control command to the vessel maneuvering system.

7. The system of claim 6, wherein the processor receives legacy data to determine a best estimation of the behavior of streamer cables and sends a vessel control command to the vessel maneuvering system.

8. The system of claim 5, wherein the environmental data comprises at least one of:
   wind speed, wind direction, wave height, wave direction, wave period, tidal stream, ocean current, and water depth.

9. The system of claim 8 further comprising:
   a coverage optimization system wherein the coverage optimization system receives position information, and sends a path prediction to the Vehicle Management System.

10. The system of claim 9 further comprising:
    a binning system we in the binning system provides seismic coverage data to the coverage optimization system.

11. The system of claim 9, wherein the coverage optimization system receives operator data, position data and environmental data.

12. The system of claim 11, wherein the position sensor monitors at least one of:
    seismic source position, seismic receiver position, streamer head buoy position, streamer tail buoy position, seismic source depth, seismic receiver depth, vessel position, vessel ground speed, water speed, vessel track, and vessel heading.

13. The system of claim 12 further comprising an operator console for operator data input wherein the operator data comprises at least one of:
    prospect coverage area definition, required midpoint coverage, operational constraints, and operator control.

14. The system of claim 10, wherein the binning system provides a current seismic midpoint coverage assessment to the coverage optimization system.

15. The system of claim 9, wherein the vessel control command comprises optimum locations for at least one of:
    the seismic source, the receiver, the vessel, streamers, and tail buoys.

16. The system of claim 14, wherein the vessel control command comprises optimum locations for at least one of:
    the seismic source, the receiver, and the vessel.

17. The system of claim 9, wherein the coverage optimization system generates a pre-plan and line selection based upon the available source and receiver assets, environmental data, past performance and operational constraints.

18. The system of claim 9, wherein the coverage optimization system generates real time optimum source and receiver locations using computed source, receiver and towing vessel coordinate, in-water asset dynamics, past midpoint coverage, midpoint coverage required, operational constraints and environmental data.

19. The system of claim 14, wherein the coverage optimization system generates a pre-plan and line selection based upon the available source and receiver assets, environmental data, past performance and operational constraints.

20. The system of claim 14, wherein the coverage optimization system generates real time optimum source and receiver locations using computed source, receiver and towing vessel coordinate, in-water asset dynamics, past midpoint coverage, midpoint coverage required, operational constraints and environmental data.

21. A method for coordinating the operation of one or more marine vessels engaged in seismic data acquisition comprising the steps of:
    providing at least one vessel for performing one or more of:
       deploying a source of acoustic energy for generating acoustic waves;

deploying a receiver for receiving seismic data; and providing a processor for monitoring a parameter of interest of the received seismic data and generating control commands for controlling the at least one vessel in response thereto to maneuver for optimum subsurface midpoint coverage.

22. The method of claim 21 further comprising the steps of:
determining a position of at least one or more of:
at least one vessel
the source of acoustic energy
the seismic receivers, and
receiving a control command in a vessel maneuvering system, the vessel maneuvering system comprising:
a receiver for receipt of vessel control commands
a processor interpreting vessel control commands
an output for executing vessel control commands.

23. The method of claim 22 further comprising the steps of receiving and using the environmental data in the processor to adjust vessel control commands.

24. The method of claim 22 further comprising the step of:
sending a vessel control command to the vessel maneuvering system to minimize deviations in the desired spatial configuration of assets.

25. The method of claim 23 further comprising the steps of:
determining a best geometric configuration for seismic sources, receivers and tow vessels sending a vessel control command to the vessel maneuvering system.

26. The method of claim 25 further comprising the step of:
determining a predicted path and sending a vessel control command to the vessel maneuvering system.

27. The method of claim 26 further comprising the step of:
receiving legacy data to compute a best estimation of the behavior of streamer cables and sending a vessel control command to the vessel maneuvering system.

28. The method of claim 25 wherein the environmental data comprises at least one of:
wind speed, wind direction, wave height, wave direction, wave period,
tidal stream, ocean current, and water depth.

29. The method of claim 28 further comprising the steps of:
receiving position information in a coverage optimization system; and
sending optimum path predictions to a Vehicle Management System.

30. The method of claim 29 further comprising the step of:
providing seismic coverage data to the coverage optimization system from a binning system.

31. The method of claim 29 further comprising the seep of:
receiving operator position data, and environmental data in the coverage optimization system.

32. The method of claim 31, wherein the position sensor monitors at least one of:
seismic source position, seismic receive position, streamer head buoy position, streamer tail buoy position, seismic source depth, seismic receiver depth, vessel position, vessel ground speed, water speed, vessel track, and vessel heading.

33. The method of claim 32 further comprising the step of:
receiving operator data in the coverage optimization system wherein the operator data comprises at least one of:
prospect coverage area definition, required midpoint coverage, operational constraints, and operator control.

34. The method of claim 30 further comprising the step of:
providing a seismic midpoint coverage assessment to the coverage optimization system from the binning system.

35. The method of claim 29 further comprising the step of:
optimizing, via the vessel control command, optimum locations for at least one of:
the seismic source, the receiver, and the vessel.

36. The method of claim 34 further comprising the step of:
optimizing via the vessel control command, optimum locations for at least one of:
the seismic source, the receiver, and the vessel.

37. The method of claim 29 further comprising the step of:
generating a pre-plan and line selection based upon the available source and receiver assets, environmental data, past performance and operational constraints.

38. The method of claim 29 further comprising the step of:
generating real-time optimum source and receiver locations using computed source, receiver and towing vessel coordinate, in-water asset dynamics, past midpoint coverage, midpoint coverage required, operational constraints and environmental data.

39. The method of claim 34 further comprising the step of:
generating a pre-plan and line selection based upon the available source and receiver assets, environmental data, past performance and operational constraints.

40. The method of claim 34 further comprising the step of:
generating real-time optimum source and receiver locations using computed source, receiver and towing vessel coordinate, in-water asset dynamics, past midpoint coverage, midpoint coverage required, operational constraints and environmental data.

* * * * *